Fig. 3

Patented Aug. 21, 1945

2,383,313

UNITED STATES PATENT OFFICE 2,383,313

PROTECTION APPARATUS

Harry William Hoffman, Anoka, and Grover H. Helmer, Minneapolis, Minn., assignors to Federal Cartridge Corporation, Minneapolis, Minn., a corporation of Minnesota Application May 7, 1943, Serial No. 486,026

17 Claims. (Cl. 192—125)

This invention relates to inspection and gauging apparatus and more particularly to photoelectrically operated systems for controlling the operation of mechanical shaping presses such as draw, punch, shear and forming presses and the like. The invention is adapted to be used on fast or slow speed single operation or multiple operation presses, the latter being of the type wherein the work undergoing formation is subjected to several operations successively or several work units are treated simultaneously.

Each cycle of operation of such press includes movement of the work into place by suitable feed mechanisms, work performing operation of the press with resultant cutting, swaging, drawing or other work operation, opening of the press, ejection of the work, and transferral of the work away from the machine or to another work position in the machine. In rapid action presses, such forming operations may take place at the rate of 50 to 60 complete cycles per minute. Only a very small fraction of a second is consumed by the actual work operation and an equally small interval is available for moving the work into and ejecting it from the work station.

During the operation of punching, drawing, shearing, shaping and the like operations, the work part undergoing treatment not infrequently becomes misaligned in respect to the die, shear, punch or other work tool, and when this occurs great damage may be done to the work tool. An operator stationed at the machine is sometimes able to stop the machine in time, after discovering the malfunctioning of the machine, but in the case of rapid operations particularly, the operator is not usually quick enough to stop the machine and the damage is done before the machine can be halted. This is no reflection on the operator because to prevent the damage, he must be on the alert hour after hour, poised under tension for a very quick movement of the stopping controls, awaiting for an emergency that may come the next instant or not for many hours. Fatigue sets in after a short period with the inevitable results that no operator however conscientious is able to guard such a machine adequately.

It is an object of the present invention to provide a photoelectric apparatus for protecting the work performing machinery.

It is a further object of the invention to provide an improved photoelectric control and operational circuits, and improved amplifying circuits.

It is also an object of the invention to provide an improved method and apparatus for activating and inactivating the photoelectric control apparatus during certain cycles of the work.

It is another object of the invention to provide an improved testing and inspection method wherein the part undergoing consideration is inspected before and after work is done, and to provide improved control apparatus for shifting the period of inspection in respect to the cyclic operation of the machine on which the work is processed.

Other and further objects of the invention include the provision of rugged, simple photoelectric circuits and apparatus, capable of use by inexperienced personnel, and provision of improved light source and photoelectric devices, circuits and controls in testing, inspecting and control apparatus.

Further objects of the invention include those inherent in and implied by the methods and apparatus herein illustrated, described and claimed.

The invention is illustrated with respect to the drawings in which.

The invention is illustrated with reference to a multiple stage draw press which may be used for forming mechanical parts in a plurality of successive operations. While the invention has particular usefulness for protection of such presses, it is to be understood that it is also widely applicable to other forms of work performing machinery, and therefore the specific apparatus herein illustrated is not to be taken as a limitation upon the invention, although features of novelty thereof are claimed.

Figure 1:
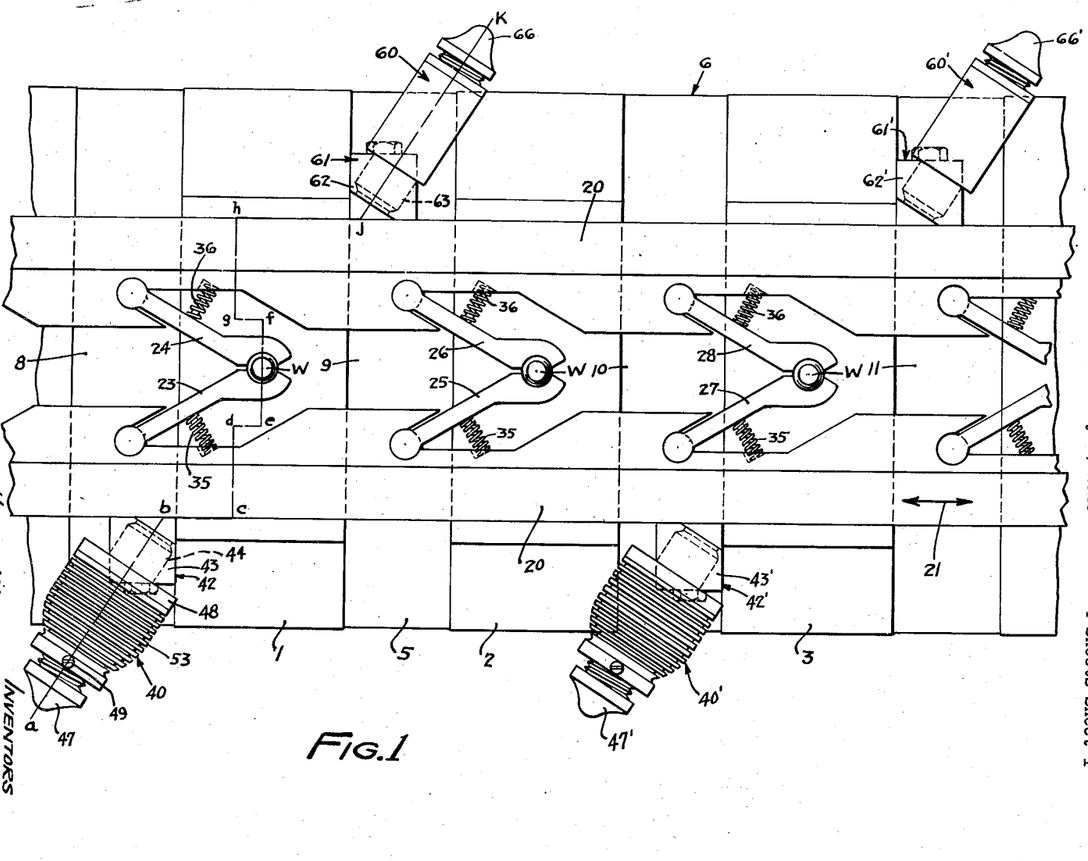
Figure 1 is a fragmentary plan view of a multiple draw press illustrating one mode of installing the invention.
Figure 2:
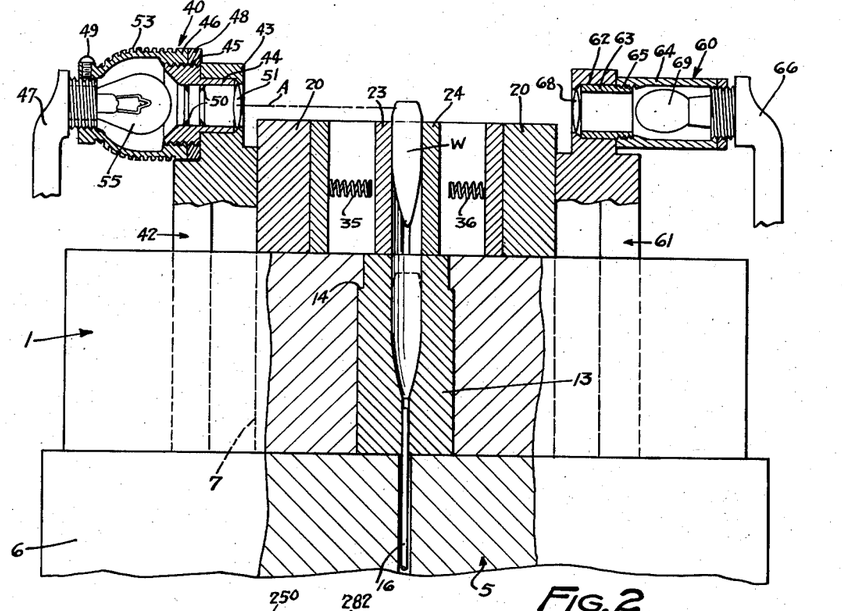
Figure 2 is a fragmentary sectional view of the apparatus of Figure 1. The portion of Figure 2 at the level of the photocell and light source is taken along the straight sectional line a—k of Figure 1, whereas the portion of Figure 2 below the line 2—2 is taken along the lines a, b, c, d, e, f, g, h, j, k in order to present certain of the mechanical details in the most illustrative manner.

In Figure 1, there is illustrated a press, which may for example be of the general type illustrated in Patent 1,602,334 to Candee. Where a press of this type is used for shell or bullet forming operations, there may be used a plurality of die blocks 1, 2 and 3 for accomplishing the shell and bullet forming operations. The dies are held upon a die block support, generally designated 5, having a heavy base portion 6 and a narrow top central portion 7. The narrow top is cut away transversely at spaced intervals to receive and support the die blocks 1, 2 and 3 and there accordingly remain lands 8, 9, 10 and 11, the upper surfaces of which are even with the top of the die blocks (Figure 2). The die blocks may be fastened to the die block support in any suitable manner, not illustrated.

Each of the die blocks 1, 2 and 3 is provided with a hardened steel die 13 of suitable design for shaping the work in an appropriate fashion. As usually constructed, the hardened steel die 13 is pressed into the die block from the lower side, as shown in Figure 2, until the shoulder 14 of the hardened steel die engages a similar shoulder on the die block. In some instances, an ejector pin 16 may be provided in the hardened steel die for ejecting the work after the shaping or forming stroke has been completed, although in other instances, as in drawing, punching, shearing and many similar operations, the work may hang upon the work tool sufficiently to be withdrawn from the press without the use of any ejecting apparatus. The specific tool shape, and the work feed, transfer and ejecting means, if used, constitute no part of the present invention.

In the illustrated multiple stage draw press, there is provided a transfer mechanism for moving the work successively from the position of die 1 to die 2 and thence to die 3, and so on through the series until the work is completed and ejected. For accomplishing this purpose, there are provided transfer bars, generally designated 20, which are held in spaced relationship, as shown in Figures 1 and 2, by any suitable spacing blocks (not illustrated). The transfer bars are arranged for oscillatory motion back and forth in the direction of the double arrow 21 (Figure 1), in timed relationship to the cyclic work motion of the press.

Upon the transfer bars 20, there are mounted opposed pairs of fingers 23—24, 25—26 and 27—28. Each of the fingers is mounted for pivoting about a vertical axis. The opposed fingers 23—24, for example, are arranged to be pressed towards each other by means of compression springs 35 and 36, and the ends of fingers 23 and 24 are shaped to engage the work before and after the working operation at the particular stage in question.

Thus, in a usual sequence of operation, transfer bars 20 may move to the left, carrying with them all of the pairs of opposed fingers attached thereto. This movement usually occurs while the work is being accomplished, i. e., while the punching, shearing or drawing operation is being accomplished by the descending tools of the press head, and the fingers stop at a position so that each pair of fingers will reside concentrically with one of the dies. Then after the press head has lifted, the work is either drawn upward or ejected in between the fingers and is there gripped as shown in Figure 2. Thus, fingers 23—24 will be above the die opening of die block 1; fingers 25—26 will be above the openings of die block 2, and fingers 27—28 above the opening of die block 3. Then as the press head lifts, the work is either drawn outwardly by the die tool or is ejected and the work is forced between the finger bars and is gripped. Then while the press head is in an elevated position, the transfer bars 20—20 move to the right, as shown in Figure 1, for a distance equal to the distance between the center lines of the die blocks and so as the press again descends, the work of each stage has been moved to the right, in Figure 1, and is forced into the die of the next stage for further shaping, punching, drawing, etc.

In such a scheme of operations, everything will proceed smoothly until perchance one of the work pieces happens to be misplaced crosswise of the die or some other derangement takes place, then as the die descends, it impinges upon the out-of-place work and great damage is done to the die frequently causing a complete breakage of the die in the die block.

In order to prevent this unwanted action, there are provided one or more photoelectric testing stations, one such station being provided at each critical or troublesome stage of the operation, or if the press performs only one operation, one photoelectric inspection device is provided at the single work performing place. Thus, in Figures 1 and 2, there are illustrated two photoelectric viewing devices and light sources and as these may be identical, only one need be described. These include a light source, generally designated 40, mounted upon a vertical post 42, having an apertured upper head 43 of such a size so as conveniently to receive the mounting and focusing nipple 44 of the light source. The post is conveniently bolted to the land 8 and is milled off at the top so as to present opposed flat faces, normal to the center line through the light source and the work (line $a$—$k$ of Figure 1).

Referring to Figure 2, it will be observed that the mounting and focusing nipple 44 has a slide or press fit in the apertured upper end 43 of the support rod 42, and may be held by a set screw, if desired. The nipple 44 is enlarged at the light carrying end and is provided with threads 45 which receive an internally threaded housing 46, the rear portion of which is likewise threaded to receive the lamp mounting socket and conduit 47. For purposes of adjustment, the housing 46 is threaded upon the nipple 44 to any degree desired and locked in place by means of a lock nut 48, and the lamp position may also be varied by screwing the lamp mounting conduit 47 into the housing 46 by a variable amount. The conduit 47 may be locked in any position by means of a set screw 49. Within the nipple 44, there are a plurality of light screening rings 50 and a condensing lens 51. Upon the outer portion of housing 46, there are provided a plurality of heat radiating fins 53 for dissipating the heat of the lamp 55. The lamp 55 may conveniently be of the automotive type and it may be noted that the life is increased several fold by providing for radiation and dissipation of the heat by means of the radiating fins 53.

The light source 40, thus projects a narrow beam of light A directly across the position normally assumed by the work piece W either as it is ready to be forced into the die 13 or immediately after the ejection of the work from the die. It will be appreciated that in this position, the work W is gripped by the fingers 23—24, 25—26 or 27—28 (depending upon the particular stage of operation), and that the upper level of the finger bars is even with the top of the transfer bars 20, so that a portion of the work W projects in a position to intercept the beam of light A, provided the work is in correct position.

Diagonally opposite the light 40, there is positioned a photoelectric cell housing, generally designated 60, which is mounted in a manner similar to the mounting of the light source 40 upon a post 61, having a beveled and apertured top 62. Post 61 may be conveniently be bolted to land 9. The photoelectric cell housing 64 is screw threaded at 65 for attaching to a nipple 63, the latter being slip fitted or pressed into the aperture 62 and optionally held in post 61 by a set screw, not illustrated. The housing 64 is threaded at its rear portion to receive socket and conduit member 66. If desired, the nipple 63 may be provided with a concentrating lens 68 or merely a glass window to exclude dust and grime. Upon the socket base 66, there is mounted a photocell 69, and the interior of the entire photocell mounting is finished a dull black so as to obviate deleterious effects of stray light.

Figure 4:
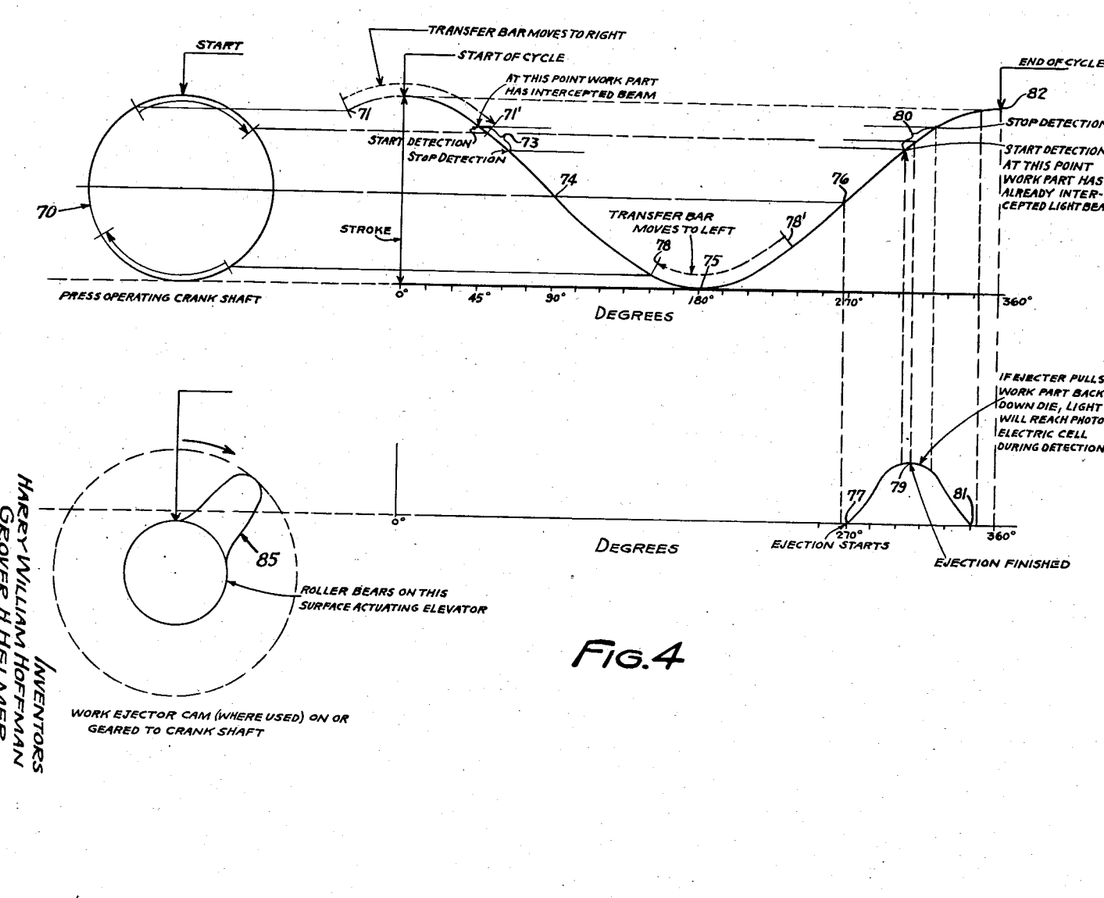
Figure 4 is a diagrammatic illustration of the cycle of operation.

Referring to Figure 4, there is diagrammatically illustrated a complete cycle of operation of the press. The eccentric, cam or crank shaft for operating the press is illustrated at 70, and the work ejector cam (when used) is shown at 85. In normal cyclic operations, the shafts 70 and 85 operated continuously and the various phases of each working cycle may thus be illustrated by the wave diagrams shown in these figures. In the illustration herein given, arrangement is made for photoelectrically inspecting the work just preceding and just after the work operation, these inspection periods being illustrated by periods 73 and 80 of the cycle. These timing periods may be achieved as hereinafter more fully described by the use of a switch operated by a cam on a reciprocating or rotating part of the press. At the point of maximum elevation of the press head illustrated at "Start of cycle," the transfer bars 20—20 are in the course of moving from left to right. This transfer bar movement is initiated at 71 and continues to 71', at which time the press head has already begun its downward stroke. The movement of the transfer bar to the right serves to carry the work at each stage to the next stage in succession (or in a single stage press, feeds the work to the machine), and at point 72 the work in normal operation has been brought to a proper position over the die opening in question. In order to determine whether this proper action has or has not occurred, a detection period is provided, during which the photoelectric inspection takes place, this period being illustrated by bracket 73. During the detection period, the press head is moving downward and if the work is not properly positioned, the press is stopped before the beginning of the work stroke at point 74. Stopping is accomplished by suitable electrical controls which are responsive to the photocell impulse, all as hereinafter described.

Assuming that the work is properly in place, the press head descends, engaging the work at 74, forcing it into the die from 74 to the low point 75. Thereupon the press head again begins its upward movement until at point 76, the tool is normally free of work. During the work stroke from 74 to 76, the transfer bars 20—20 move to the left, this movement being started at 78 and completed at 78', so as to be ready to receive the work as it is withdrawn or ejected from the die. Normally, the transfer bar is in position to receive the work, and the work is withdrawn or ejected upwardly in between fingers 23—24 (or 25—26, 27—28, as the case may be), to the position shown in Figure 2, in which position the work intercepts the light beam A. A second inspection period, as indicated at the bracket 80, is provided in order to determine that such correct functioning has occurred and that the work is in position between the fingers to be moved by the transfer bar to the next station. Should the work not be in proper condition at this point, the machine is stopped, as hereinafter described.

The motion of the ejector pin is accomplished by an elevator cam which is schematically illustrated at 85 in Figure 4, the action of this cam being initiated at or shortly after the press head has been withdrawn from the work, point 76. The elevator cam begins its work at 77, completes its work at 79 and again descends to the lowered position, as indicated at 81, shortly before the press head has reached the end of its cycle of operation indicated at 82. The detection period 80 is preferably timed so as to begin slightly before the elevator cam has reached its ultimate point 79 and continues after the elevator cam has begun to descend so that the press will be stopped in the event the work adheres to the ejector pin and be pulled back down towards the die (and hence out of the grip of the transfer bar fingers).

The detection periods, during which the photoelectric inspection apparatus is effective to cause stopping of the press in the event of derangement of the work, is preferably determined by means of a cam operated switch operated in conjunction with the press. The vertically reciprocating press head of the press serves very well. It is expedient in some installations to accomplish the timing of the detection periods by means of a fixed cam solidly fastened to the press head or other reciprocating part of the machine, the cam being arranged to operate upon a suitable switch on the frame of the machine. In other installations, it is desirable to provide an oscillatory cam hereinafter more fully described, in order to slightly vary the timing of the detection period with reference to the oscillatory motion of the press. In the scheme of operation illustrated, the light sources 40 operate all the time and illuminate the photocell 60 except when an object is interposed by the work. Since the work units W are normally moved in working and transfer to and from the die block position, it follows that the lamp light shines upon the cell periodically even during proper operation. In order that the photocell impulses so produced may not effect a false stoppage of the machine, the photocell action is obviated except during the inspection periods, this being accomplished by the machine operated cam, as hereinafter described.

In some schemes of operation, it is desirable, for example, to inspect the work as it is ready to be worked upon at die block 1 and immediately after it has been ejected from die block 1. The second inspection at die 1 serves to protect die 2, in case the work is tipped over by the action of the transfer bars or, for other reasons, does assume a position propitious for transfer, while at die 1. Similarly, the inspection before and after working at die block 3 serves as an inspection for dies 2 and 3 and the next succeeding die in the press as may in some instances be provided. Thus, the first inspection at die 3 serves to protect die 2, in the event the work stuck in die 2 or was ejected beyond the transfer bars. Any absence of work during the first inspection at die 3 thus serves to stop the press and protect the dies. If desired, however, photoelectric inspection stations may be provided at each work station and for a single stage press, only one photo-electric inspection station would be provided, inspection being made either before, or before and after the work is acted upon.

Figure 3:
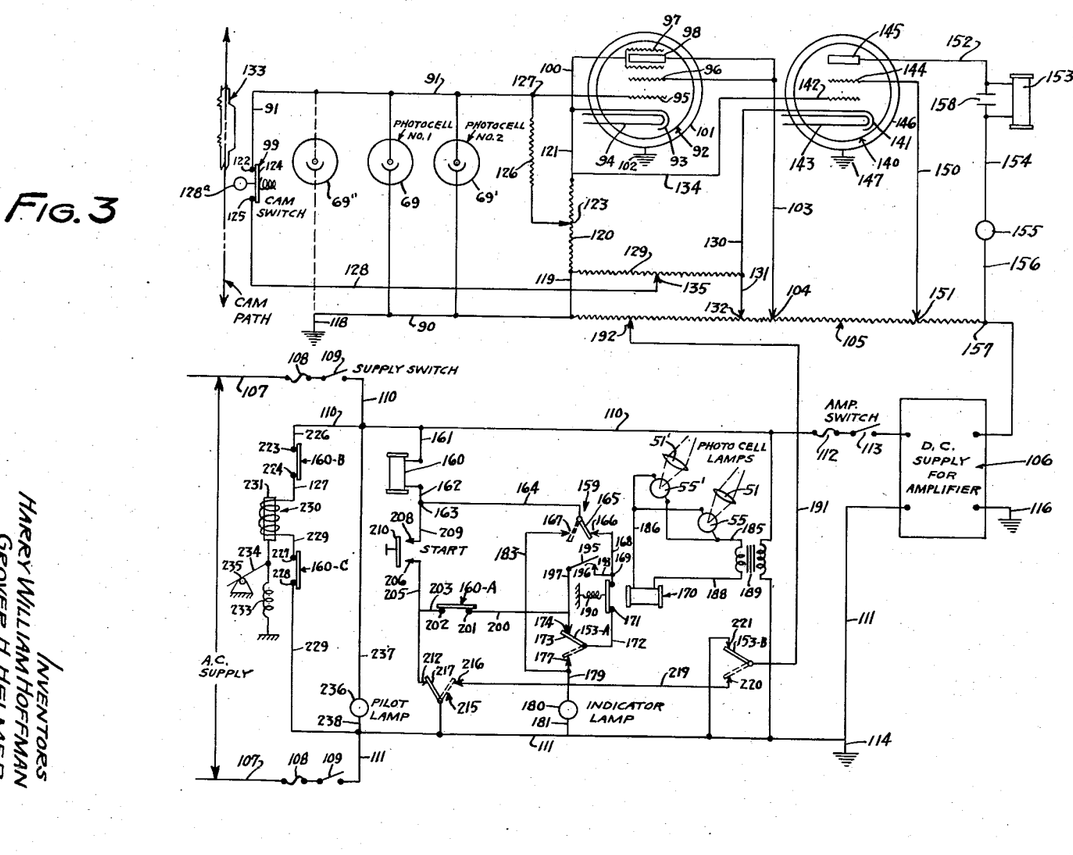
Figure 3 is a wiring diagram of the responsive and control circuits utilized.

Referring to Figure 3, there is illustrated amplifying and control circuits for utilizing the very low energy output of the photocells during the effective inspection periods and for obviating such action during non-inspection periods. Photoelectric cell 69 (at die block 1) and photocell 69' (at die block 3), together with any other photoelectric cells 69'', which may be utilized in the control apparatus of one machine are connected in parallel relation to ground connection 90 and to a grid connection 91 of a grid controlled thermionic amplifier 92. The amplifier 92 may be of the type including only a cathode grid and plate, but is preferably of the five element type including cathode 93, (which is indirectly heated by an alternating current filament 94), a control grid 95, supplemental grid 96, screen grid 97 and plate 98. The screen grid 97 is connected to the cathode 93 by means of connection 100 and the control grid 95 is connected to the photoelectric cells by wire 91. The entire tube is protected by a shield 101, which is grounded at 102. The supplemental grid 96 and plate 98 are connected by means of lead wire 103 to tap 104 on a potentiometer resistor, generally designated 105, which is supplied with direct current at approximately 300 volts D. C. from the power pack 106. The power pack 106 is energized from alternating current supply lines 107 of any suitable voltage through fuses 108 and control switch 109 through lines 110 and 111 and through power pack fuse 112 and switch 113. Line 111 is grounded as indicated at 114 and one terminal of the D. C. output of the power pack is grounded, as indicated at 116. The potentiometer resistor 105 is connected to line 90, which is grounded at 118.

Referring again to the thermionic amplifier 92, it will be observed that positive potential is applied to the plate 98 from potentiometer resistor 105 by means of lead 103 connected to adjustable tap 104. The cathode 93 is connected through line 119, resistor 120 and line 121 to the cathode 93. From an intermediate tap 123 on resistor 120, there is connected a resistor 126 which is in turn connected to the photoelectric cell lead 91 at 127. To the junction of line 119 and resistor 120, there is connected an intermediate resistor 129 which is connected by means of line 130 to the cathode 141 of a thermionic amplifier, generally designated 140, and by means of line 131 to tap 132 on a potentiometer resistor 105. One terminal of each photocell is connected to ground wire 90. The energized photocell-grid connection 91 is connected to terminal 122 of the cam operated switch, generally designated 99, the other terminal 125 of said switch being connected by line 128 to intermediate tap 135 on resistor 129. The switch 99 is preferably of the micro type, capable of circuit closure upon operation of a few thousandths of an inch of travel of roller 128a. As illustrated, switch plate 124 is spring biased into circuit closing relation against contacts 124 and 125, but is movable to open circuit condition when cam 133 pushes against roller 128a. The switch 99 is preferably mounted on the machine frame and cam 133 on a reciprocating machine part such as, for example, the vertically reciprocating tool carrying head of the press.

The cathode lead 121 of the thermionic amplifier 92 is connected by means of lead 134 to the grid control 142 of the amplifier 140. The cathode 141 of amplifier 140 is indirectly heated by filament 143, energized from an alternating current source, and the entire tube 140 is shielded as indicated at 146, the latter being grounded at 147. A screen grid 144 of the amplifier 140 is connected by means of line 150 to tap 151 on potentiometer resistor 105 and the plate 145 is connected by means of line 152, to a relay 153 which is preferably of the telephone type, and thence through line 154, milliammeter 155 and line 156 to the maximum voltage tap 157 of the potentiometer resistor 105. A condenser 158 is preferably connected across the relay 153.

The telephone type relay 153 is provided with two make and break contacts 153—A and 153—B, which are effective in the machine control circuits as hereinafter described. As shown in Figure 3, the contacts 153—A and 153—B are in the position which they assume when the coil of relay 153 is energized, this condition being obtained when the photocells 69—69' are both dark or when the cam switch is not being held in open position by the cam. When the coil of relay 153 is de-energized, contacts 153—A and 153—B move to the dotted line positions shown in Figure 3.

The machine control circuits for effecting starting and stopping of the press includes the clutch operating motor element having solenoid 230, the movable core 231 which actuates a lever 234 pivoted at 235. The solenoid is retracted by weight or spring 233. During normal running of the press, the solenoid is energized as shown in Figure 3, due to the closure of both contacts 160—B and 160—C.

The control of solenoid 230 is controlled by a relay 160, which operates contacts 160—A and the previously mentioned contacts 160—B and 160—C in the circuit of solenoid 230.

A switch 159 may optionally be included and is for the mechanical detection of physical deviations in the material or dimensions of the work parts undergoing processing. This switch is of any suitable mechanically operated type having a normal condition shown in full lines of Figure 3. When deviations in the material or dimensions occur, the movable element 165 of switch 159 assumes the dotted line position. The mechanical detection switch may optionally be used in conjunction with the photoelectric inspection device for controlling the operation of the press. Where not used, lead 164 is connected to lead 168 and lead 183 is omitted.

A lamp relay 170 is provided so that the press will be stopped in the event any of the lamp bulbs 55 or 55' burn out during service. One terminal of each of the lamps 55 and 55' is connected to line 185 which extends to one terminal of a suitable low voltage alternating current transformer 189. The other terminal of each of the lamps 55 and 55' is connected to line 186 leading to one terminal of the winding relay 170, the other terminal of the winding being connected by line 188 to other terminal of the low voltage winding of transformer 189. The primary of transformer 189 is connected directly to lines 110 and 111 and is energized continuously when switches 109—109 are closed. The relay 170 is biased to the open circuit position by means of spring 190 and is adjusted so that the decrease in current due to the burning out of any one of the light source lamps 55 and 55' (or other bulbs as may be used) will cause the relay 170 to drop out, breaking contact between 169 and 171, thus causing the press to stop as hereinafter indicated.

It is expedient, in many installations, to utilize a screen or window that is pulled down in front of the machine for the protection of the operator during the automatic operation of the machine. The screen or window may be utilized to operate switch 215, with the result that when the screen or window is in a position so as to protect the operator, a movable element 217 of the switch is in contact with terminal 212, and when the window is moved out of the way so as to allow adjustments of the machine, the switch blade 217 will be moved to the dotted line position (Figure 3).

The terminal 216 of the window switch 215 is connected by line 219 to terminal 220 which is engageable by contact 153—B of the relay 153. When relay 153 is energized, the contact 153—B is normally in engagement with an opposed terminal 221, which is connected directly to the grounded alternating current supply line 111, but upon de-energization of the telephone relay 153, contact 153—B drops into contact with terminal 220.

*Operation*

It may be assumed that the mechanical power supply of the press is operating but that the conventional clutch is disengaged and the press is at a standstill. In order to place the press and the protection system in operation, switches 109—109 are closed thereby energizing the alternating current supply lines 110—111. Switch 113 is also closed thereby energizing the amplifier power pack 106.

The energization of lines 110—111 is conveniently indicated by a pilot lamp 236, which is connected through lines 237 and 238 respectively, to the alternating current supply lines 110 and 111. Energization of supply lines 110 and 111 applies power to the primary of transformer 189. This causes the illumination of lamps 55 and 55' and consequently energizes lamp relay 170. The energization of relay 170 establishes a circuit between stationary contacts 169 and 171. It is assumed that the mechanical detector switch 159 (if used) is in the position shown in Figure 3, viz: establishing a circuit with stationary contact 166, and that the movable contact 217 of window or screen switch 215 is in engagement with stationary contact 212 likewise as indicated in Figure 3. It is likewise assumed that a work part is in proper position as shown in Figure 2 and photocells 69 and 69' are hence not illuminated.

The closure of switch 113 supplies alternating current power to the power pack 116 and thus serves to energize the potentiometer resistor 105. This in turn serves as a direct current power source for the amplifier portion of the system shown in the upper part of Figure 3, and the amplifier is placed in operation.

During normal operation, with the photocells dark, current is passed in the cathode anode circuits of both amplifying tubes 92 and 140 and the relay 153 is therefore energized. As a result, the contacts 153—A and 153—B of the relay 153 are in the raised position, viz: contact 153—A is in engagement with stationary contact 174 and contact 153—B is in engagement with stationary contact 221. Relay 153 is very fast acting, and may conveniently be a telephone type relay with two pairs of make and break contacts, normally biased to make with one of each of the sets of contacts and capable, when energized, of making with the other of each of the sets of contacts. So long as the clutch solenoid 230 is de-energized, the press does not operate due to the fact that solenoid plunger 231 is in the lower position. In order to initiate operation of the machine, push-button 210 is momentarily pressed, thus establishing a circuit from alternating current source 110 through line 161, the coil of relay 160, line 162, junction 163, line 209, across push button contacts 208—206, line 205, across contacts 212 and 217 of switch 215 and thence to grounded line 111. It will be noted that the starting circuit just traced, by-passes all of the safety and protection controls and by holding in the start button 210, the press may be caused to operate a few cycles to feed in parts.

Once the relay 160 is energized by pushing the start button 210, it establishes a work circuit through the clutch solenoid 230 through contacts 160—B and 160—C, and also causes the establishment of a self-holding circuit by operation of its contact 160—A.

The circuit of clutch solenoid 230, so established, extends from alternating current power source 110, through line 226, contacts 223—224 which are bridged by contact 160—B, thence through line 127 to the winding of clutch solenoid 230, line 229 to contact 227, and thence over movable contact 160—C of relay 160 to stationary contact 228 and then through line 229 to the grounded alternating current line 111. The clutch solenoid 230 accordingly operates and lifts solenoid core 231 upwardly against the action of spring or weight 233 and the machine begins to operate. The self-holding circuit for relay 160 is established from relay 160, junction 163, through line 164 and the movable contact 165 of the mechanical detector switch to contact 166 of said switch, thence through line 168, terminal 169 of relay 170, across the movable contact of relay 170 and contact 171 through line 172 through movable contact 153—A of the telephone relay 153 to contact 174, through lines 197 and 200 to contacts 201 and 202 which are bridged by contact 160—A of relay 160, thence through line 203 to line 205, and contacts 212 and 217 of the safety switch 215, to grounded alternating current line 111. The machine is accordingly in operation.

As previously explained, the reciprocating work forming operation of the press serves periodically to open the cam switch 99 through the action of cam 133 upon the roller 128. Whenever the switch 99 is opened, the photocells 69—69' are in condition to serve, effectively to inspect and guard the work, and are effective to stop the operation of the machine in the event a work part is deranged sufficiently to allow light from either of the lamp sources 55—55' to impinge upon photocells 69—69' respectively. When switch 99 is closed, as occurs when cam 133 is out of engagement with the roller 228 of switch 99, the action of the photoelectric inspecting device is obviated, this non-function period being allowed during the actual working portions of the cycle and during such portions of the work transferring movement as to cause the work parts normally to be out of alignment with light beams A. This functioning and non-functioning effect of the photocell and amplifier circuits is accomplished as follows:

Assume that the photocells 69—69' are dark and switch 99 is depressed (open). With the cathode 93 of amplifier tube 92 heated, the tube is conductive and current flows to the positive tap 104 (of potentiometer resistor 105) through line 103, plate 98, cathode 93, line 121, resistor 120, line 119, through line 90 to ground 118. Under such steady current conditions (photocells being dark), a steady potential exists at tap 123 on resistor 120, this potential being more positive than ground potential due to the resistance drop through the portion of the resistor 120 between tap 123 and grounded line 119. Resistor 126 is of high ohmic value but due to the fact that switch 99 is open and the photoelectric cells are at a low level of emissivity (due to the fact that they are dark) the positive potential of tap 123 (on resistor 120) is communicated to the grid-photocell line 91 at tap 127. The potential of cathode 93 (tube 92) is thus determined by tap 123.

The plate circuit of tube 140 may be traced from tap 157 (resistor 105) through line 156, milliammeter 155, line 154, coil of relay 153, line 152, plate 145, cathode 141 and line 130 to tap 132 on potentiometer resistor 105. Since the tap 151 of the screen grid 144 of tube 140 is adjustable and the potential of cathode 141 is likewise adjustable through tap 132, the conductivity of tube 140 may thus be conveniently adjusted so as to cause telephone relay 153 to remain operated under such steady (photocell dark) conditions.

When either of the photocells 69 or 69' (or any other photocell 69" which may be used in the inspection system) becomes illuminated while switch 99 is open, the conductivity of the photocell increases, viz: the resistance decreases and allows the positive potential on grid line 91 to be dissipated to ground through the illuminated photocell. The resistance 126 is of sufficiently high value that it is unable to replenish the charge on line 91 so long as the photocell remains illuminated, and there is a consequent reduction in potential of line 91. Thermionic tube 92 then becomes less conductive. As a consequence, the positive potential gradient, which normally exists from grounded lines 90 (and 119) through resistor 120 to line 121, is caused to decrease with consequent reduction in the positive potential at tap 123 on resistor 120. Inasmuch as resistor 126 is fed from tap 123, there is an even lesser tendency for the voltage of the grid line 91 to be replenished as the conductivity of tube 92 decreases and the effect is thus differentially cumulative. Once the photocell becomes darkened and tube 92 starts to become less conductive, its initial response in the direction of decreasing conductivity in effect helps to decrease the potential of the grid 91 and hence helps still further to decrease the conductivity of the tube 92. In this manner, extreme sensitivity is achieved with small photocells and relatively low candle power light beams.

As the conductivity of tube 92 decreases, the potential on line 134 becomes less positive and consequently reduces the normal positive potential on grid 142 of tube 140. This causes tube 140 to become less conductive and relay 153, which has been energized, drops out and allows contact 153—A to move from contact 174 to contact 177, and contact 153—B to move from contact 221 to contact 220. The initial operation of relay 153 may be very rapid, but contact 153—B serves, as hereinafter explained, to maintain relay 153 de-energized, no matter how short the duration of the initial drop-out period may be.

The movement of contact 153—A serves to interrupt the self-holding circuit of relay 160 and it therefore drops out, causing contacts 204, 160—A, 160—B and 160—C to interrupt the circuits they had been maintaining. Consequently, the clutch solenoid 230 is de-energized and the core 231 moves under the influence of the weight or spring 233 and causes the clutch of the machine to be dis-engaged from its power source thereby bringing the press to rest.

The press may however coast a slight distance and this may be sufficient to cause cam 133 to move out of engagement with the roller 128 thus allowing switch 99 to close. Since the relay 160 and relay 230 are relatively slow acting, the instantaneous de-energization of relay 153 would ordinarily not allow sufficient time for relays 150 and 230 to operate. The re-closure of cam switch 99 would thus serve to re-establish normal operation, even though relay 153 had de-energized during the inspection period and would obviate the effect of the photoelectric protection system. In order to prevent the telephone relay 153 from again being energized with consequent false establishment of normal operation, there are provided relay contacts 153—B. When the relay 153 is de-energized, contact 153—B moves into engagement with contact 220, and the ground potential, which was normally applied through line 191 upon tap 192, is removed. This in effect inserts additional resistance in the potentiometer resistor 105, the inserted resistance being between tap 192 and grounded line 90. This causes a sufficient change in the voltages of taps 132 and 151 to shift the thermionic amplifier tube 140 to non-conductive condition and causes the telephone relay 153 to remain in de-energized condition regardless of the position of cam 133 in respect to switch 99.

The machine being thus stopped and the operator raises the window or guard in front of the machine, consequently the movable contact of window switch 217 is moved out of engagement with contact 212 and into engagement with contact 216. This establishes a grounding circuit for tap 192 of resistor 105 as follows: From ground 114 through line 111 through movable contact 217 and stationary contact 216 of the switch 215, line 219, contact 220 and the movable contact 153—B of the telephone relay 153 (which is then de-energized), through line 191 to tap 192. This re-establishes the normal ground at tap 192, and the voltage gradient along potentiometer resistor 105 resumes a normal condition. When the deranged work parts are again placed in proper position to interrupt the light impinging upon the photocell 69 (or 69'), or if switch 99 has been closed by the coasting of the machine to standstill, the amplifier 92 again resumes a normal condition, and the machine is ready to be started by pushing the start button 210, as previously explained.

During normal operation, the work parts are transferred by means of the transfer bars 20, and this normally allows flickering light to fall upon the photocells. However, cam 133 is of such a length and is so positioned as to allow only short inspection periods (i. e., opening of switch 99) and during such times as the photocells should normally be dark due to the light interruption caused by properly positioned work parts. The inspection periods are thus determined by the length of cam 133. During the remaining non-inspection period in the complete cycle, cam 133 is out of engagement with roller 128 and switch 99 is closed. This completely obviates the effect of the photoelectric inspecting device and therefore light falling upon the photocells 69—69' due to movement of the work parts during transfer or working, does not effect a stoppage of the machine. The disabling action due to closure of switch 99 is accomplished as follows:

During the normal inspection period, the positive potential of line 91 is capable of being dissipated (made less positive) due to the increased conductivity of the photoelectric cells 69—69' when they are illuminated, but when switch 99 is closed, a circuit is established from tap 135 on resistor 129 through line 128, contacts 125, 124, 122 (of switch 99) to line 91. The potential of tap 135 is approximately the same positive potential as normally prevails at tap 123 of resistor 120 during the periods the photocells 69—69' are dark. However, the power supplied through the resistor 129 (via switch 99 when closed) is comparatively much greater than is available through the high resistance 126 and is sufficient to maintain the voltage of the photocell-grid line 91 at its normal positive level even though one or all of the photocells 69—69' become illuminated. Thus by simple closure of the switch 99, the voltage of line 91 is maintained and accordingly the falling of light upon the photocells is ineffective to stop the press.

The operation of mechanical detector switch 159 is effective to cause stopping of the normally operated machine by breaking the circuit of relay 160 which is normally maintained through the movable contact 165 of switch 159 and stationary contact 166. When this occurs, relay 160 is de-energized and the machine stops. When the contact 165 engages contact 167, a circuit is established from line 110, line 161, coil of relay 160, line 162, junction 163, line 164 through the movable contact of switch 165, stationary contact 167, line 183, line 179 through indicator lamp 180 and line 181 to alternating current line 111.

In the event either of the lamps 55 or 55' burn out, the lamp relay 170 becomes de-energized and breaks the circuit from contact 169 to 171. This causes the de-energization of the holding circuit of relay 160 and consequent stoppage of the machine.

Since the thermionic amplifiers 92 and 140 are normally in a conductive condition, any disablement of these thermionic tubes which decreases their conductivity will cause stoppage of the machine due to the dropping out of the relay 153. Thus, should filament 94 of tube 92 or the filament 143 of tube 140 burn out, this automatically causes a stoppage of the machine by de-energization of relay 153. When the operator of the machine discovers that no work part is de-ranged, he is immediately informed that the stoppage is due to causative factors other than disarranged work parts. Similarly, any failure of the power pack 106 likewise causes an interruption of direct current supply to the potentiometer resistor 105 and this likewise causes the dropping out of relay 153 and consequent stoppage of the machine.

In the event of normal stoppage, or stoppage due to failure of the amplifiers 92—94, telephone relay 153, power pack 106 or photocell illuminating lamps 55—55', the machine may be started for operation without benefit of the inspection device until servicing is available, by closure of the by-pass switch 195, which allows a circuit to be established from alternating current supply line 110 through line 161, coil of relay 160, line 162, junction 163, line 164, movable contact 165 and stationary contact 166 of the mechanical detector switch, line 168, line 193, contact 196, by-pass switch 195, lines 197 and 200 through the contacts 201, 202 and 160—A (of relay 160), line 205, contacts 212 and 217 of the switch 215 to alternating current supply line 111. The holding circuit of relay 160 may thus be established and the machine operates until service on the inspection and protection apparatus is available. The machine, is of course, re-started by momentary closure of the starting switch 210 after any interruption.

When the stoppage of the machine is due to the normal guarding functioning of the photoelectric cells and consequent operation of relay 153, a circuit is maintained through indicator lamp 180 as follows:

From alternating current line 110, line 161, relay 160, line 162, junction 163, line 164 through switch 159, line 168 through the closed contacts 169 and 171 of relay 170, line 172 through movable contact 153—A and stationary contact 177 of relay 153, line 179, indicator lamp 180, line 181 to the grounded alternating current supply line 111. The current flow through the indicator lamp is insufficient to cause the actuation of relay 160 and since the lamp is burning steadily, the operator is informed that the stoppage has been due to the photoelectric cell guarding apparatus, and consequently that work is disarranged.

Where the mechanical detector switch 159 is of a type that is brought periodically into contact with the work, the movable element 165 may momentarily be shifted from contact 166 to contact 167 and back again for each work piece which is mechanically irregular. By adjustment of the spacing of contacts 166 and 167, such momentary interruptions may be made insufficiently small so as to be shorter than the dropout time of relay 160. As a consequence, for each cycle of operation of the press during which mechanical defect passes, the lamp 180 is flashed. The operator may then stop the machine normally by opening the supply line switches 109—109, or raising the window with consequent opening of the circuit of relay 160 at switch 215. Where the duration of opening of the mechanical detector switch 159 is sufficiently long to allow relay 160 to drop out, this will cause stoppage of the machine and the lighting of lamp 180.

Figure 5:
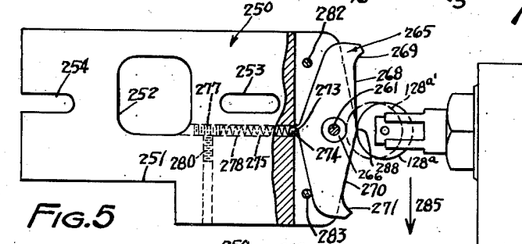
Figures 5, 6 and 7 are views of a desirable cam utilizable in the invention.
Figure 6:
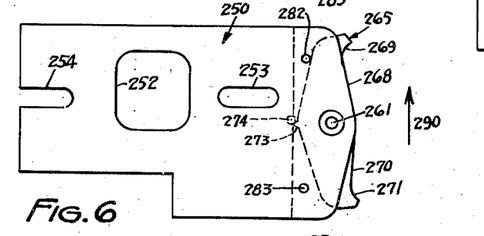
Figure 7:
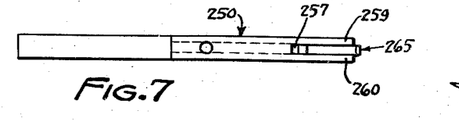

Referring to Figures 5, 6 and 7, there is illustrated a modified form of cam for operating switch, generally designated 99. The frame of the cam mounting is generally designated 250, and is shaped at 251 and formed with apertures 252 and slots 253—254 so as to allow convenient mounting on the machine and adjustment in the horizontal direction as shown in Figure 5. The frame 250 has a slot milled in it at 257 shown in Figure 7. Bifurcated ends 259 and 260 receive a rockable cam plate, generally designated 265, which is provided with a bushing 266 and pivoted upon the pin 267 passing through the bifurcated ends. The cam plate 265 is symmetrical about its pivot axis and has opposite identical cam surfaces 268 and 270 which are curved up at the ends 269 and 271 respectively.

At the mid-back portion, there is a central tip 273 against which a detent ball 274 is adapted to be pressed by means of a spring 275. The spring 275 may be adjusted by means of screw 277, which is threaded into a hole 278 drilled in the body of the frame 250. The adjustment screw 277 is in turn adapted to be held in adjusted position by means of a set screw 280. The bifurcated ends are provided with stops 282 and 283. The frame 250 is preferably mounted on a reciprocating part, and the switch on a stationary part, although the cam may be mounted upon a stationary part of the machine and the switch 99 thereby is mounted upon the moving part. Thus, when the plate 250 is moving vertically downward in the direction of arrow 285, the leading edge of the cam, i. e. the center portion 288 abuts against the roller and forces it in the switch closing position shown in Figure 5. The roller 128ᵃ is pressed backward from the dotted position 128ᵃ' by the portion 270 of the cam adjacent the middle 288. The roller then rolls along the then nearly vertical part 268 until the portion 269 of the cam comes abruptly into contact with the roller 128ᵃ. When this occurs, the resistance of the roller 128ᵃ, which is spring pressed to the left as shown in Figure 5, by an internal spring (not illustrated), causes a sufficient force to be placed upon the ball detent 274 by means of the tip 273 so as to force the ball backwardly against spring 278 whereupon the cam 265 is rocked upon its pivot 267 into the position shown in Figure 6, in which it stays until the press part moves in the vertically upward direction illustrated by arrow 290 in Figure 6, and again contacts the switch roller 128ᵃ. Upon the upward stroke, the roller 128ᵃ is again engaged, this time by the portion of cam surface 268 near the mid-point 288 of the cam, and the roller is then pressed to the right again opening the switch 99. The roller continues to roll along the then substantially vertical surface 270 until the portion 271 engages the roller whereupon sufficient force is again placed upon the rocking cam 268 to overcome the resistance of the spring pressed detent ball 274 and the cam plate is snapped to the position shown in Figure 5.

The merit of the snap action cam and switch arrangement illustrated in Figures 5, 6 and 7 resides in the fact that slight variations in timing of the inspection period may thus be provided with reference to a datum point on corresponding reciprocating parts of the press. Thus, referring to pins 194 (Figure 4), it will be observed that the inspection period on the down stroke of the press head, indicated by the bracket 73, occurs at a somewhat lower position of the press head than does the inspection period 80 of the up stroke. This functioning is of especial merit so as to allow timing of the inspection period to occur during periods of the press operation when stopping is most favorable.

Many obvious variations will be apparent to those skilled in the art and such are intended to be within purview of the invention illustrated, described and claimed.

We claim as our invention:

1. A photoelectric inspection apparatus for work parts that are periodically moved into a work inspection station comprising means for focusing a light beam across said work inspection station in a position to shine upon work parts in position at the station, a photocell positioned to collect light not intercepted by said work parts, a thermionic amplifier for said photocell having a cathode, grid and plate, a source of direct current potential having its negative side connected to said cathode and positive side connected to said plate, said photocell being connected to said grid and negative side of the direct current source, a high resistance feed circuit connecting the grid and a source of positive potential which is positive in respect to the negative side of said source of direct current potential, a low resistance feed circuit connecting said grid and a said source of positive potential, and means for interrupting said low resistance feed circuit when the work should normally be at said inspection station.

2. An apparatus of the type set forth in claim 1 further characterized in that means is provided for working the parts at a work station and for moving said parts to and from a work station, said means for interrupting the low resistance circuit when the parts are being moved and while undergoing working.

3. A photoelectric amplifier comprising a light source and a photocell for normally collecting light therefrom, an amplifier tube having a cathode, grid and plate, a source of direct current plate potential having its positive side connected to said plate and its negative side connected to the cathode, a high resistance feed circuit connecting the said grid and a voltage supply having an intermediate value relative to the negative and positive sides of said source, said photocell being connected between the grid and negative side of said source, a low resistance feed circuit connected to said grid and to another voltage supply of intermediate value relative to the negative and positive sides of said source, and switch means for periodically opening said low resistance feed circuit.

4. In an apparatus for working parts successively having a reciprocating working means and means on said apparatus for moving parts to and from a position to be worked upon by said working means, means for interrupting the operation of said working means when a work part is not in position to be worked comprising a light source for focusing a beam of light upon a position normally assumed by said work part before being worked upon, a photocell positioned to collect light not intercepted by a work part in said position, a thermionic amplifier for said photocell, having a cathode, grid and plate, a source of direct current potential having its negative connected to said cathode and positive connected to said plate, said photocell being connected to said grid and said negative, a high resistance feed circuit connected to the grid and a source of positive potential, a low resistance feed circuit connecting said grid and a source of similar positive potential, and means operated synchronously with said working means for interrupting said low resistance feed circuit except for a short period preceding working of said part.

5. In an apparatus for working parts successively having a reciprocating working means and means on said apparatus for moving parts to and from a position to be worked upon by said working means, means for interrupting the operation of said working means when a work part is not in position to be worked comprising a light source for focusing a beam of light upon a position normally assumed by said work part before being worked upon, a photocell positioned to collect light not intercepted by a work part in said position, a thermionic amplifier for said photocell, having a cathode, grid and plate, a source of direct current potential having its negative connected to said cathode and positive connected to said plate, said photocell being connected to said grid and said negative, a high resistance feed circuit connected to the grid and a source of positive potential, a low resistance feed circuit connecting said grid and a source of similar positive potential, and means operated synchronously with said working means for interrupting said low resistance feed circuit except for a short period preceding and succeeding working of said part.

6. A photocell amplifier comprising a grid controlled thermionic tube, a high resistance circuit connecting said grid and a first supply of electrical potential for supplying a limited flow of electrical energy to said grid, photocell connecting said grid and a second supply of potential which is negative in respect to the value of said first supply for draining the electrical energy from said grid in accordance with the quantity of light falling on said cell, and a low resistance circuit having circuit control means therein connected to said grid and to a source of electrical potential which is positive in respect to said second supply for supplying electrical energy to said grid in excess of the amount capable of being drawn off by said photocell.

7. A photocell amplifier comprising a grid controlled thermionic tube having a plate and cathode, a unidirectional source of plate potential having its positive side connected to said plate, a resistor having an intermediate tap, said resistor being connected from the negative side of said source to said cathode, a high resistance circuit connecting said intermediate tap of the resistor and said grid and a photocell connecting the grid and negative side of said source.

8. The apparatus of claim 6 further characterized in that a low resistance connector having a control switch therein is provided between said grid and said source of electrical potential which is positive in respect to said second supply.

9. A photoelectric inspection apparatus for work parts that are periodically moved into a work inspection station comprising means for focusing a light beam across said work inspection station in a position to shine upon work parts in position at the station, a photocell positioned to collect light not intercepted by said work parts, a thermionic amplifier for said photocell having a cathode, grid and plate, a direct current source of plate potential having its positive side connected to said plate and negative connected through a potentiometer resistor to said cathode, said photocell being connected to the grid of said tube and to the negative side of said source of potential, a high resistance feed circuit for establishing a predetermined potential on said grid when the photocell is not collecting light, and a low resistance feed circuit for maintaining said potential on the grid when the photocell collects light during normal movement of parts into and out of inspection position.

10. A photoelectric inspection apparatus for work parts moved periodically through normal positions, a light source positioned to direct light against said work parts, a photocell positioned to collect said light when the light is not intercepted by a work part being inspected, an amplifier tube having a cathode, grid and plate, a source of direct current potential, the positive side of said source being connected to the plate of the amplifier tube and the negative side being connected through a resistor to the cathode of said tube, the grid of said tube being connected to a source of potential having a value intermediate the potentials of said positive and negative sides said photocell being connected from said grid to the negative power source, and a parallel circuit connecting said grid and a source of potential having a value, relative to said negative and positive sides, not substantially less positive than the potential at which the grid is maintained when the photocell is dark, and means for periodically opening said parallel circuit when said work parts are normally in a position to be inspected.

11. In a reciprocating metal working machine wherein the work is fed into the machine worked upon and ejected as a cycle of operation, an improved control mechanism comprising a photoelectric inspection apparatus including means for projecting a light beam on the work fed into the machine and photocell means responsive thereto for determining proper positioning of the work during said cycle and during a time period prior to and after being worked upon and a switch means for inactivating the inspection apparatus except for a predetermined interval before and except for another predetermined interval after being worked upon.

12. In a reciprocating metal working machine wherein the work is fed into the machine worked upon and ejected as a cycle of operation, an improved control mechanism comprising a photoelectric inspection apparatus including means for projecting a light beam on the work fed into the machine and photocell means responsive thereto for determining proper positioning of the work during said cycle and during time periods prior to being worked upon, and a switch means for inactivating the inspection apparatus except during said time periods.

13. The apparatus of claim 11 further characterized in that said inspection apparatus is inactivated by a cam operated switch which is closed cyclically by the machine for a short period preceding and a short period after the work operation.

14. The apparatus of claim 11 further characterized in that said inspection apparatus is inactivated by a cam operated switch which is closed cyclically by the machine for a short period preceding and a short period after the work operation, said cam being movable slightly to vary the cyclic timing.

15. In an inspection apparatus for a metal working machine having a frame and a metal working tool movable in cyclic reciprocating relation with respect to the frame, a photoelectric inspection device including switch means for disabling the inspection device during a portion of each reciprocating cyclic work motion of said metal working machine, said switch means being cam operated by a reciprocating member of the machine, the cam being shaped so as to present an identical pattern on each side of a pivot point, a pivot support for said cam at said pivot point, and stop means for holding the cam in limited pivoted condition for presenting to said switch means an identical switch operating cam surface beginning at a limited range in the movement of said reciprocating member.

16. The apparatus of claim 15 further characterized in that the cam operated switch is a micro-switch having a circuit closer operated upon initial motion of an operating member which is thereafter movable through an additional distance, the cam being pivotally shifted twice each cycle of the metal working machine by co-action with the member of said micro-switch after operation of said circuit closer therein.

17. An inspection device for work parts undergoing working simultaneously at a plurality of stations in a reciprocating working machine for said parts comprising light sources at each of a plurality of said stations for projecting light against the space assumed by a properly positioned part undergoing working, a photocell for each station positioned to intercept light that is not intercepted by a work part, a thermionic amplifier having a cathode, grid and anode, means having a positive potential relative to ground potential and connected to the grid for electrically charging said grid at a limited rate, said photocells being electrically connected to the grid and to ground for discharging the grid when light falls upon a cell, the rate of charging of said grid being sufficiently low to allow substantial discharge by a photocell when the latter is illuminated, and a second means connected to said grid and to a source of supply which is positive in respect to ground for charging the grid at a rate beyond the capacity of the cells to discharge it even when illuminated.

HARRY WILLIAM HOFFMAN.
GROVER H. HELMER.